(12) United States Patent
Kimura et al.

(10) Patent No.: US 8,245,538 B2
(45) Date of Patent: Aug. 21, 2012

(54) GLASS SUBSTRATE AND A MANUFACTURING METHOD THEREOF

(75) Inventors: Yukiyasu Kimura, Yokohama (JP);
Yuhei Nitta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/461,505

(22) Filed: Aug. 13, 2009

(65) Prior Publication Data

US 2009/0305020 A1  Dec. 10, 2009

Related U.S. Application Data

(62) Division of application No. 11/598,803, filed on Nov. 14, 2006, now abandoned.

(30) Foreign Application Priority Data

Nov. 17, 2005 (JP) ................................. 2005-332509
Oct. 30, 2006 (JP) ................................. 2006-294223

(51) Int. Cl.
*C03B 29/10* (2006.01)
*C03B 31/00* (2006.01)

(52) U.S. Cl. ..................................... 65/93; 65/90; 65/94

(58) Field of Classification Search ........................ 65/93
See application file for complete search history.

(56) References Cited

U.S. PATENT DOCUMENTS

| | | | | |
|---|---|---|---|---|
| 3,472,641 A | * | 10/1969 | Gray | ............................... 65/60.5 |
| 3,951,633 A | * | 4/1976 | Danihel | ............................ 65/23 |
| 4,533,571 A | * | 8/1985 | Kramer et al. | ................. 427/180 |
| 5,019,538 A | * | 5/1991 | Borrelli et al. | ................... 501/13 |
| 6,748,765 B2 | * | 6/2004 | Pitbladdo | ........................... 65/53 |
| 6,758,064 B1 | * | 7/2004 | Kariya | .............................. 65/91 |
| 6,796,146 B2 | * | 9/2004 | Burnham | .......................... 65/93 |
| 2001/0039814 A1 | * | 11/2001 | Pitbladdo | ......................... 65/193 |
| 2002/0012076 A1 | | 1/2002 | Vos et al. | |
| 2002/0082158 A1 | * | 6/2002 | Chacon et al. | ................... 501/66 |
| 2003/0037569 A1 | * | 2/2003 | Arbab et al. | ....................... 65/22 |
| 2004/0237590 A1 | * | 12/2004 | Sakoske et al. | ................ 65/60.5 |
| 2004/0263060 A1 | | 12/2004 | Gilmour et al. | |

* cited by examiner

Primary Examiner — Matthew Daniels
Assistant Examiner — Jodi C Franklin
(74) Attorney, Agent, or Firm — Oliff & Berridge, PLC

(57) ABSTRACT

A method for manufacturing a glass substrate by a fusion process includes flowing fused glass into a fusion pipe, and gradually cooling and solidifying the fused glass by allowing the glass to flow downward from the fusion pipe. An asperity is formed on a surface of the glass substrate by fastening and pressing the glass toward a direction of thickness of the glass with a pair of transfer rollers while the glass is flowing down from the fusion pipe.

5 Claims, 9 Drawing Sheets

GLASS SUBSTRATE AND A MANUFACTURING METHOD THEREOF

This is a Division of application Ser. No. 11/598,803 filed Nov. 14, 2006. The disclosure of the prior application is hereby incorporated by reference herein in its entirety.

BACKGROUND

The present invention relates to a glass substrate, which is applied to the flat panel display (citing FPD hereinafter) such as the liquid crystal device panel and to a manufacturing method thereof. The present invention is particularly useful for a glass substrate using for a large size FPD for example televisions, computer displays and the like.

In a few years, FPD represented by a liquid crystal type and a plasma type, spreads rapidly. An emission type display was also released recently, and a development is further activated.

For manufacturing these types of FPD, it is necessary to precisely form minute patterns on a tabular glass plate. For example, the explanation will be provided below in accordance with a TFT type liquid crystal device. The TFT type liquid crystal device is made by forming and arranging a plurality of thin film transistors on a glass substrate in precision to match each TFT on each pixel. For arranging precisely a photolithography technology is used.

Namely, a metal layer is formed on a first glass substrate, and then photoresist is coated on the metal layer. Next, after TFT patterns for plurality of panels are exposed and developed, etching is performed. As the result, the metal layer remains in a shape of TFT patterns on the first glass substrate. This layer is typically referred to as the "TFT substrate."

On a second glass substrate, a shading material layer is formed and further photoresist is coated on the shading material layer. Next, a plurality of color filter (citing CF hereinafter) patterns, which will correspond to TFT patterns, are exposed and then etched. As the result, the shading material layer remains in a shape of CF patterns on the second glass substrate. Next, by using photolithography technology, which is the same as that used for forming the TFT patterns, CF is formed in accordance with the patterns of the shading material layer. A red filter, a green filter, and a blue filter are formed by repeating CF forming process three times. This layer is typically referred to as the "CF substrate."

After an alignment layer is coated on each of the TFT substrate and CF substrate, both substrates are adhered together through glass beads as spacers in a state that the alignment layer of each substrate becomes an inner side, and further, out of pattern areas are adhered by sealant.

Next, after cutting out each panel, material of liquid crystal is injected to a space between the TFT substrate and the CF substrate through a hole previously provided for supplying the material of liquid crystal, and the hole is sealed. Finally, a polarizer is adhered on a screen, and then the TFT type liquid crystal panel is completed.

Each pixel of TFT pattern should be aligned with each area of correspondent CF pattern. If the patterns are misaligned with respect to each other, a precise image cannot be processed. Therefore, both the TFT pattern and the CF pattern should be formed in high dimensional precision.

As an index for estimating whether the TFT pattern or the CF pattern is formed in predetermined dimensional precision, a plurality of measurement patterns are provided out of the TFT pattern or the CF pattern. After exposing the TFT pattern or the CF pattern and then developing, distances between these measurement patterns are measured and the difference from design values are obtained, and then preciseness is estimated.

In the meantime, a majority of glass substrates used for FPD are manufactured by a process called fusion process. The fusion process is the method for manufacturing a plate like glass involving flowing a fused glass into a container called a fusion pipe, overflowing the fused glass from the fusion pipe, and solidifying the fused glass during downward flow of the fused glass. The fusion process can manufacture glass substrates in a low cost because a polishing process is not needed.

A method for manufacturing a glass substrate by fusion process will be explained below. FIG. 8 shows a fusion pipe which is used for manufacturing a glass substrate by fusion process. In FIG. 8(a), a fusion pipe 4 has a structure that its upper part is a trough like portion 41 which is open to upper direction, and that both sides of the trough like portion 41 are bank like portions 42 whose levels are higher than the that of the trough like portion 41. A lower part of the fusion pipe 4 has a wedge like shape, and its bottom is a blade like portion 43. Heaters (not shown) are built in the fusion pipe 4 and surfaces of the fusion pipe 4 can hold a temperature at which maintaining a glass-fusing state. A cross sectional view of the fusion pipe 4 in A-A direction is shown in FIG. 8(b).

FIG. 9 shows a process for manufacturing a glass substrate by the fusion process. A fused glass G flows successively into the trough like portion 41 of the fusion pipe 4, which is maintained at a high temperature. The fused glass G overflows from bank like portions 42 to both sides of the fusion pipe, further flowing down along side surfaces of the fusion pipe 4, and reaches the blade like portion 43, which is at the bottom of the fusion pipe 4. At the blade like portion 43, flows of fused glass join together and forming plate like glass GP, and the plate like glass GP is gradually cooled as it flows downward. In this process, the plate like glass GP is gradually solidified, and further it is pulled down by a rotation of rollers 45. Afterwards, by cutting in desired dimension a glass substrate is completed.

Additional manufacturing processes involving the fusion process are described in following documents:
U.S. Pat. No. 3,338,696
U.S. Pat. No. 3,682,609

To enlarge FPD and to increase efficiency of manufacturing FPD, a size of a glass substrate for FPD is expanding year by year. As far as a substrate for liquid crystal is concerned, a size of the substrate called seventh generation, which is already practically used, is very large as 1870 mm×2200 mm, and still larger size substrate is proposed.

However, in forming patterns on a large size glass substrate, there is a problem that the dimension of the actually formed pattern occasionally has an error beyond allowable range in comparison with design value.

As far as this problem is concerned, as optical systems of an exposure apparatus, which is used for exposing patterns, is adjusted in high precision level, it is confirmed that patterns to be exposed have substantially no distortion. Namely, it is not due to a precision level of optical systems. Moreover, a stage of the exposure apparatus is finished as a very high precision flat surface, and it is confirmed that the surface of the vacuum contacted glass substrate on the stage is in the focus depth of the exposure optical system installed in the exposure apparatus. Therefore, it also does not due to a problem of flatness level of the stage. Accordingly, it can be considered that distances between measurement patterns exposed on the glass substrate are in allowable ranges at least in the state that the substrate is vacuum contacted on the stage of the exposure apparatus.

However, in spite of above confirmations, still there is a problem that the distances between measurement patterns which are measured after exposing and developing are occasionally not in the allowable ranges.

Moreover, as another problem; there is a phenomenon that a static electricity is generated when the glass substrate, being coated with photoresist and being exposed the TFT patterns or CF patterns, is unloaded from the stage; and by discharging the static electricity to a surface of the photoresist, a defect of the TFT pattern or the CF pattern occurs.

The inventors of the present invention have found out that there is an effect for these problems by decreasing the contact area between a vacuum contact portion of the stage and the glass substrate. For decreasing the contact area between a vacuum contact portion of the stage and the glass substrate, the present inventors formed an asperity on at least one of the surfaces of the vacuum contact portion of the stage and the glass substrate. The present inventors formed minute asperity on the surface of the vacuum contact portion of the stage by a grinding process. Despite that an effect for preventing the static electricity is achieved in a short period after the grinding process, the effect decreases as time passes, and it also appears that the effect increases again by applying the grinding process again on the surface of the vacuum contact portion of the stage. One reason why the asperity on the surface of the vacuum contact portion shrinks during successive contacts with the glass substrates may be due to attrition with the glass substrate. As a result, the effect for preventing the static electricity decreases.

Although it is possible to form an asperity by machining the glass substrate after it is manufactured, such a process increases the cost for manufacturing the glass substrate. In order to decrease the cost, it is desirable to establish a method for manufacturing the glass substrate in which an appropriate asperity is formed in process of making the substrate.

The various embodiments of the present invention were made under the circumstances explained above. Objects of the present invention, include, but are not limited to, providing a glass substrate which enables the manufacture of a FPD low cost, and providing an efficient manufacturing method of a glass substrate.

SUMMARY

To solve the above described subject matter, embodiments of the present invention may use the structures shown in the figures. However, each reference sign with parentheses, which indicates each element, is only an exemplification and it does not limit each element.

A first embodiment of the present invention provides a glass substrate whose surface has an asperity of a height in the range from 10 nm to 20 nm and of a period in the range from 0.1 mm to 1 mm.

According to the glass substrate of the first embodiment, it is possible to satisfy stabilization of contact and preventing generation of the static electricity simultaneously.

A second embodiment of the present invention provides a glass substrate whose surface has an asperity of a height in the range from 15 nm to 20 nm and of a period in the range from 0.1 mm to 0.6 mm.

According to the glass substrate of the second embodiment, it is possible to satisfy stabilization of contact and preventing generation of the static electricity simultaneously.

A third embodiment of the present invention provides a method for manufacturing a glass substrate by fusion process, the method comprising the steps of; flowing fused glass (G) into a fusion pipe (1), and gradually cooling and solidifying the fused glass (G) by flowing downward from the fusion pipe (1), and forming an asperity on a surface of the glass substrate by depositing particles (GB) on a surface of the fused glass (G).

According to the method for manufacturing the glass substrate of the third embodiment, it is possible to manufacture the glass substrate, which satisfies stabilization of contact and preventing generation of the static electricity simultaneously.

A fourth embodiment of the present invention provides a method for manufacturing a glass substrate by fusion process, the method comprising the steps of; flowing fused glass (G) into a fusion pipe (1), and gradually cooling and solidifying the fused glass (G) by flowing downward from the fusion pipe (1), and forming an asperity on a surface of the glass substrate by colliding particles against the glass flowing down from the fusion pipe (1) from a side direction.

According to the method for manufacturing the glass substrate of the fourth embodiment, it is possible to manufacture the glass substrate, which satisfies stabilization of contact and preventing generation of the static electricity simultaneously.

A fifth embodiment of the present invention provides a method for manufacturing a glass substrate by fusion process having the following steps; flowing fused glass (G) into a fusion pipe (1), and gradually cooling and solidifying the fused glass (G) by flowing downward from the fusion pipe (1), and forming asperity on a surface of the glass substrate by fastening and pressing the glass (GP) toward a direction of thickness of the glass with a pair of transfer rollers (16A and 16B) while the glass is flowing down from the fusion pipe.

According to the method for manufacturing the glass substrate of the fifth embodiment, it is possible to manufacture the glass structure, which satisfies stabilization of contact and preventing generation of the static electricity simultaneously.

A sixth embodiment of the present invention provides a method for manufacturing a glass substrate by fusion process, the method comprising the steps of; flowing fused glass (G) into a fusion pipe (3), overflowing the fused glass (G) toward two directions of the fusion pipe (3) and flowing the fused glass (G) along two side surfaces (36 and 37) of the fusion pipe (3), joining the fused glass at a blade portion (33) which is a bottom end of the fusion pipe (3), and gradually cooling and solidifying the fused glass (G) by flowing downward from the blade portion (33), and forming an asperity on a surface of the glass substrate by periodically changing a temperature difference between the two side surfaces (36 and 37) of the fusion pipe (3).

According to the method for manufacturing the glass substrate of the sixth embodiment, it is possible to manufacture the glass structure, which satisfies stabilization of contact and preventing generation of the static electricity simultaneously.

DETAILED DESCRIPTION OF EMBODIMENTS

Now, preferred embodiments of the present invention will be described with reference to the accompanying drawings. However, the present invention is not limited by the embodiments.
(Embodiment 1)

Figure 1:
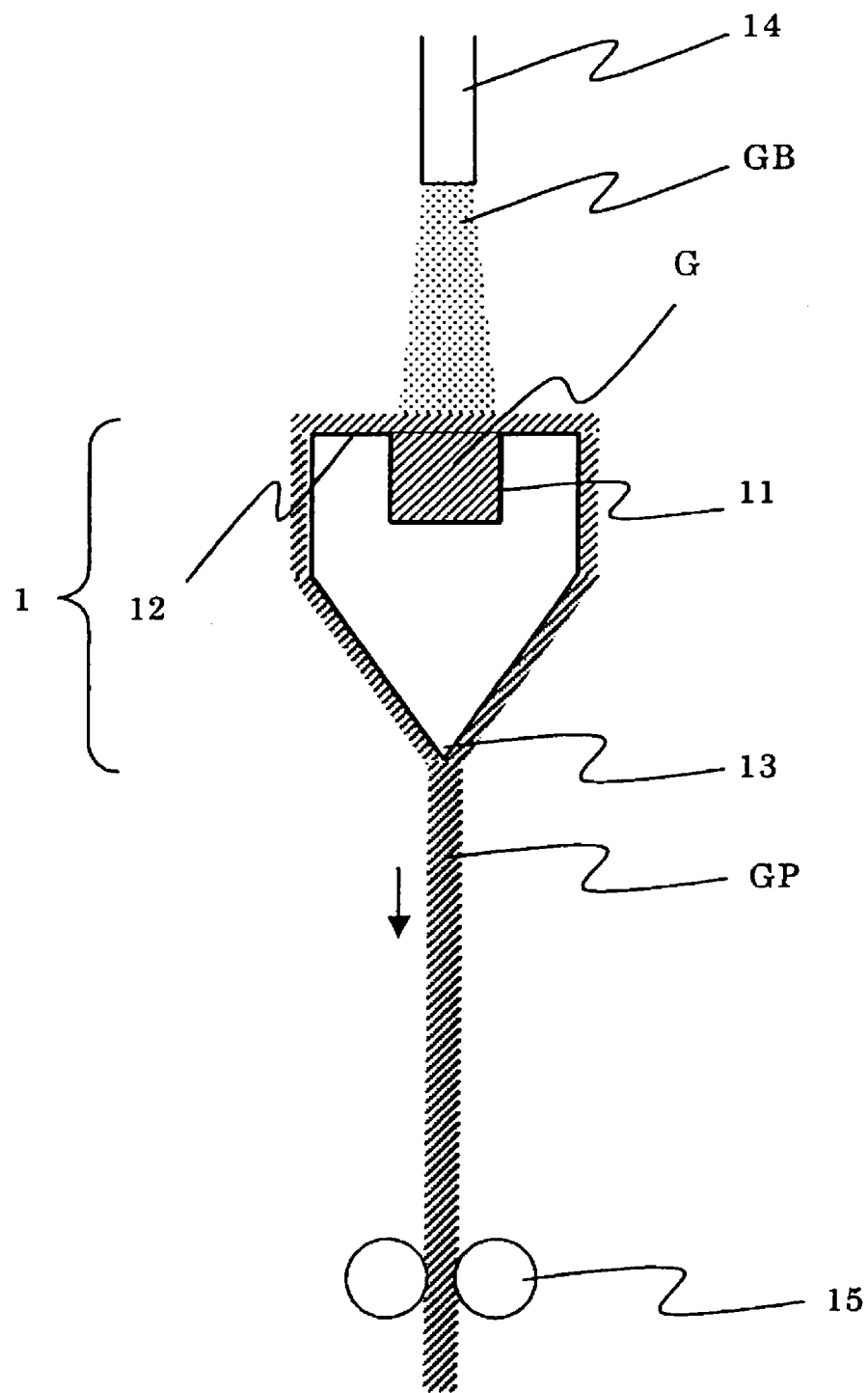
FIG. 1 is a conceptual figure showing a glass substrate manufacturing by a fusion process according to a first embodiment.

FIG. 1 is a conceptual figure showing a manufacturing method according to the first embodiment. In FIG. 1, 1 shows a fusion pipe. Upper part of the fusion pipe 1 is made as a trough like portion 11, which is open to the air, and a bank like portions 12 are arranged on both sides of the trough like portion 11. Moreover, the bottom part of the fusion pipe 1 is made as a blade like portion 13. Moreover, heaters (not shown) are installed inside the fusion pipe 1, and surfaces of the fusion pipe 1 can be kept in temperature for maintaining a glass fusing state by heating fusion pipe 1 with the heaters.

Fused non-alkaline glass G flows into the trough like portion 11 of the fusion pipe 1. As used herein, non-alkaline glass means a glass, which does not content alkaline metal such as Sodium (Na), Potassium (K), and so forth. Fused non-alkaline glass G fills the trough like portion 11.

Nozzle 14 is arranged above the fusion pipe 1, and glass particles GB comprise the same glass material as the fused glass G are discharged from the tip of the nozzle. The glass particles GB fall down on a surface of the fused glass G and adhere to the surface of the fused glass G. With maintaining this state, the fused glass G overflows the bank like portion 12 and flows down along a side surface of the fusion pipe 1.

The fused glass G reaches the blade like portion 13, which is at a bottom of the fusion pipe 1, and while descending, solidifies to form a plate like glass GP. The plate like glass GP further is pulled down by the revolution of rollers 15. Afterwards, the plate like glass GP is cut into a desired size and a glass substrate is completed.

As the glass particles GB are adhered on the surface of the glass substrate manufactured in above described method, each glass particle is in the state that it protrudes from the surface of the glass substrate. Namely, an asperity according to the protrusion is formed on the surface of the glass substrate.

When forming TFT patterns or CF patterns on such glass substrate, a process control is conducted so as to vacuum contact a side on which asperity is formed. By this procedure, a condition for stabilization of contact and preventing generation of the static electricity are satisfied simultaneously, and defect prevention is stably accomplished. Moreover, as light is moderately scattered by the asperity on the surface of the glass substrate, there is also an effect for anti reflection.

In the present embodiment, it is desirable that the diameters of the glass particles are in the range from 15 nm to 40 nm. Moreover, it is only necessary to appropriately determine quantity of the glass particle discharged from the nozzle in accordance with quantity of flowing fused glass G and size of the glass particles.

In addition, FIG. 1 shows that the fused glass G flows down on both side surfaces of the fusion pipe 1 and joins at the blade like portion 13. However, it is also available that the fused glass G flows down on either side of the fusion pipe 1 and descends from the blade like portion 13.

Figure 2:
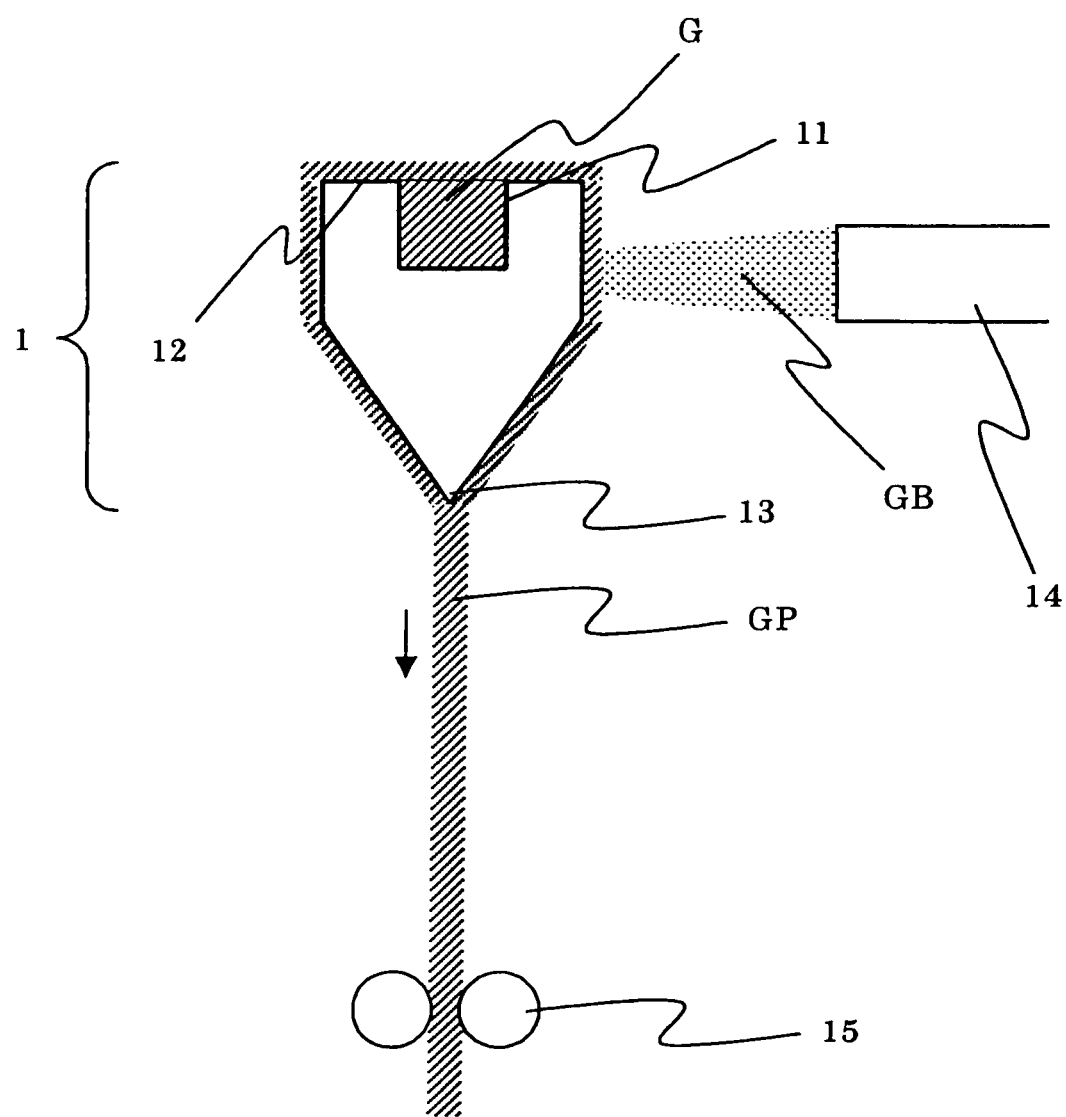
FIG. 2 is a conceptual figure showing a glass substrate manufacturing by a fusion process according to the first embodiment.

Moreover, nozzle 14 does not have to be arranged above the fusion pipe 1. It can be arranged above a flow passage which leads the fused glass to the fusion pipe 1, and alternatively, it can be arranged in a side direction of the fusion pipe 1. The configuration in which the nozzle is arranged in a side direction of the fusion pipe 1 is shown in FIG. 2.

Moreover, in the present embodiment, the asperity is formed on the glass substrate by adhesion of the glass particles on the fused glass G. However, it is available that the asperity can be formed by removing the glass particles from the glass substrate after they are adhered by any known removal method, for example, ultrasonic cleaning. In this case, glass particles comprising glass other than non-alkaline glass can be used, and further, particles comprise material other than glass can also be used. In these cases, it is convenient that the melting point of such particles is higher than that of non-alkaline glass.
(Embodiment 2)

Figure 3:
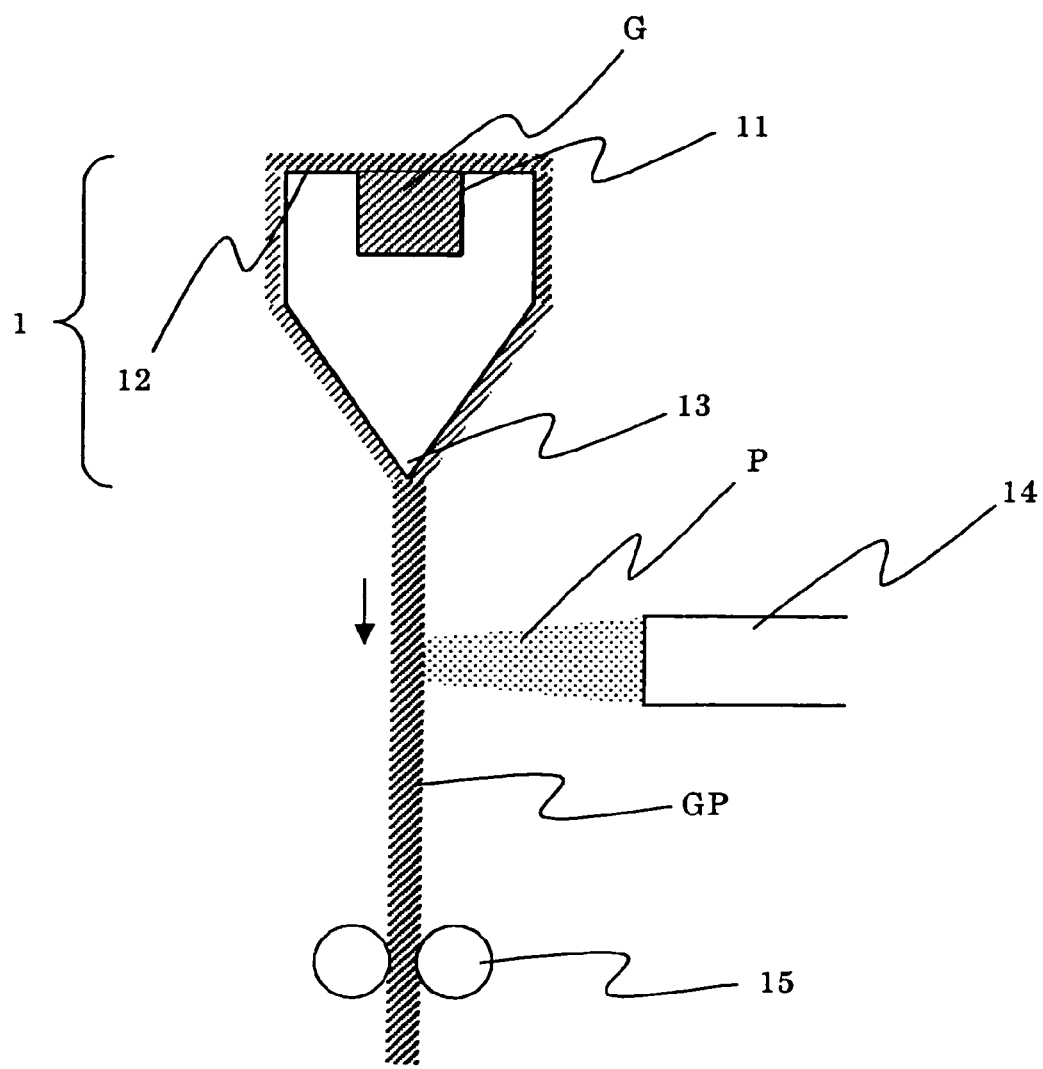
FIG. 3 is a conceptual figure showing a glass substrate manufacturing by a fusion process according to a second embodiment.

FIG. 3 is a conceptual figure showing a manufacturing method according to the Embodiment 2. In FIG. 3, the fusion pipe 1 has the same structure as that of one which is used in the Embodiment 1, and reference sign is used in common with the Embodiment 1.

In the present embodiment, a nozzle 14 is arranged obliquely downward of a fusion pipe 1. Glass particles having diameters of about 0.1 μm are discharged from the nozzle 14.

Fused non-alkaline glass G flows into the trough like portion 11 of the fusion pipe 1, fills the trough like portion 11, and after that, overflows and flows down along side surface of the fusion pipe 1.

The fused glass G reaches the blade like portion 13, which is at a bottom of the fusion pipe 1, descends and solidifies to form the plate like glass GP, and further the plate like glass GP is pulled down by the revolution of rollers 15.

During descent of the plate like glass GP, the glass particles are discharged from the nozzle 14 and collided against the surface of the plate like glass GP before the plate like glass GP solidifies completely. Through this process, the asperity is formed on the surface of the plate like glass GP by being generated by plastic deformation. Afterwards, the plate like glass GP is cut into a desired size and a glass substrate is completed.

When forming TFT patterns or CF patterns on such glass substrate, a process control is conducted so as to vacuum contact a side on which the asperity is formed. By this procedure, a condition for stabilization of contact and preventing generation of the static electricity are satisfied simultaneously, and defect prevention is stably accomplished. Moreover, as light is moderately scattered by the asperity on the surface of the glass substrate, there is also an effect for anti reflection.

In the present embodiment, the diameters of the glass particles are not limited to about 0.1 μm, and it is only necessary to appropriately determine them in accordance with conditions of a placement of the nozzle, discharge speed of the glass particles, and so forth.

Moreover, glass particles are used in the present embodiment, however, the material of particles is not limited to glass, and it is available to use ceramics or metal particles.

Moreover, a structure in the present embodiment is that the fused glass flows into the fusion pipe, overflows and flows down along a side surface (or side surfaces) of the fusion pipe. However, it is only necessary that the fused glass flows down from a slit opened at the bottom of the fusion pipe without overflowing.

(Embodiment 3)

Figure 4:
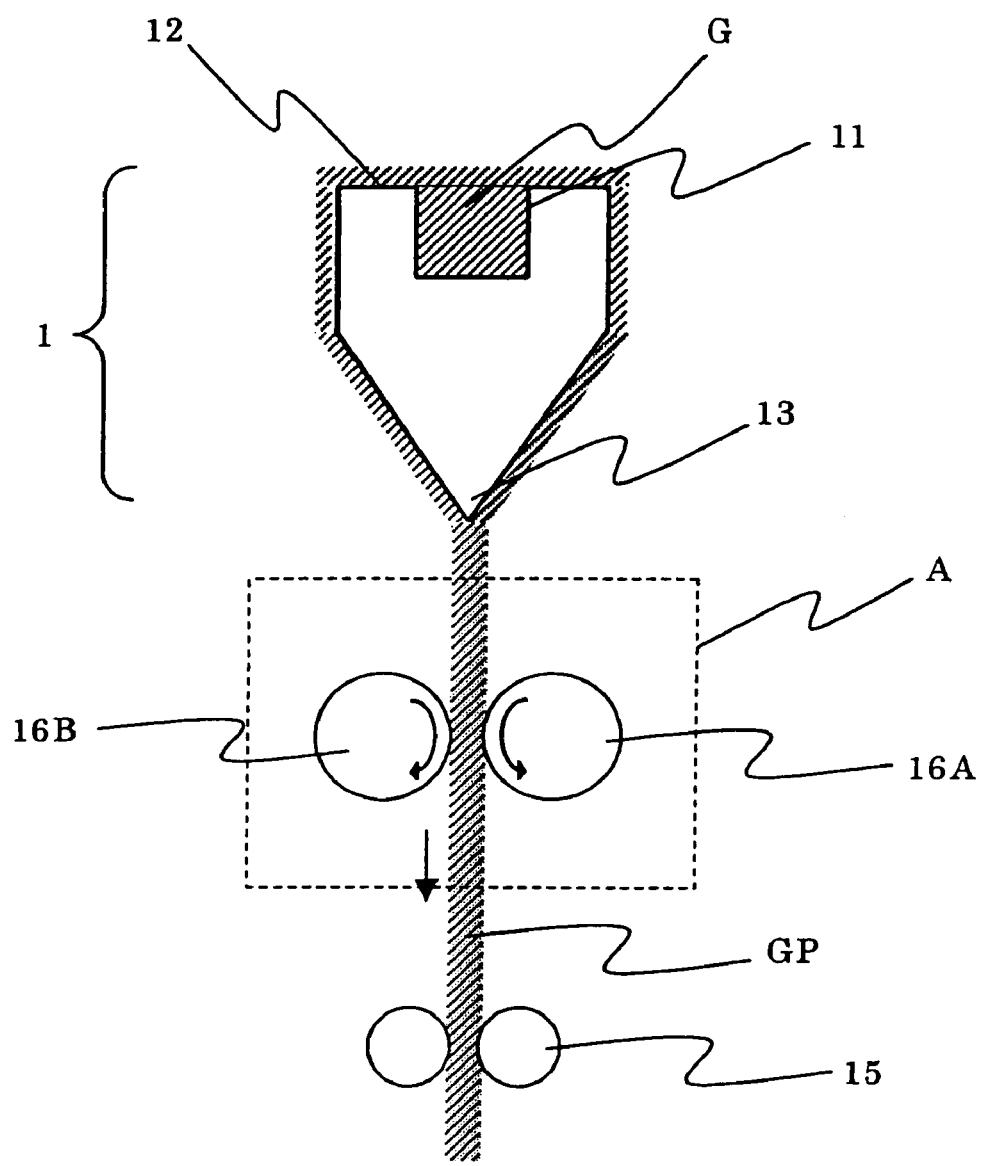
FIG. 4 is a conceptual figure showing a glass substrate manufacturing by a fusion process according to a third embodiment.

FIG. 4 is a conceptual figure showing a manufacturing method according to the Embodiment 3. In FIG. 4, the fusion pipe 11 has the same structure as that of one which is used in Embodiment 1, and reference signs are used in common with Embodiment 1.

In the present embodiment, a pair of transfer rollers 16A and 16B is placed below the fusion pipe 11. An asperity is formed in advance on a surface of either one of the transfer rollers (16A or 16B). The pair of transfer rollers is placed to pinch and apply a pressure on both surfaces of a plate like glass GP in a direction of thickness of it in a phase in which solidification of the plate like glass GP is not completed.

Fused non-alkaline glass G flows into the trough like portion 11 of the fusion pipe 1, fills the trough like portion 11, and after that, overflows and flows down along side surface of the fusion pipe 1.

The fused glass G reaches the blade like portion 13 which is at a bottom of the fusion pipe 1, descends and solidifies to form the plate like glass GP. The plate like glass GP is applied a pressure on both surfaces of it in a direction of a thickness of the plate like glass by the pair of transfer rollers 16A and 16B firstly, and then is pulled down by the revolution of rollers 15.

Figure 5:
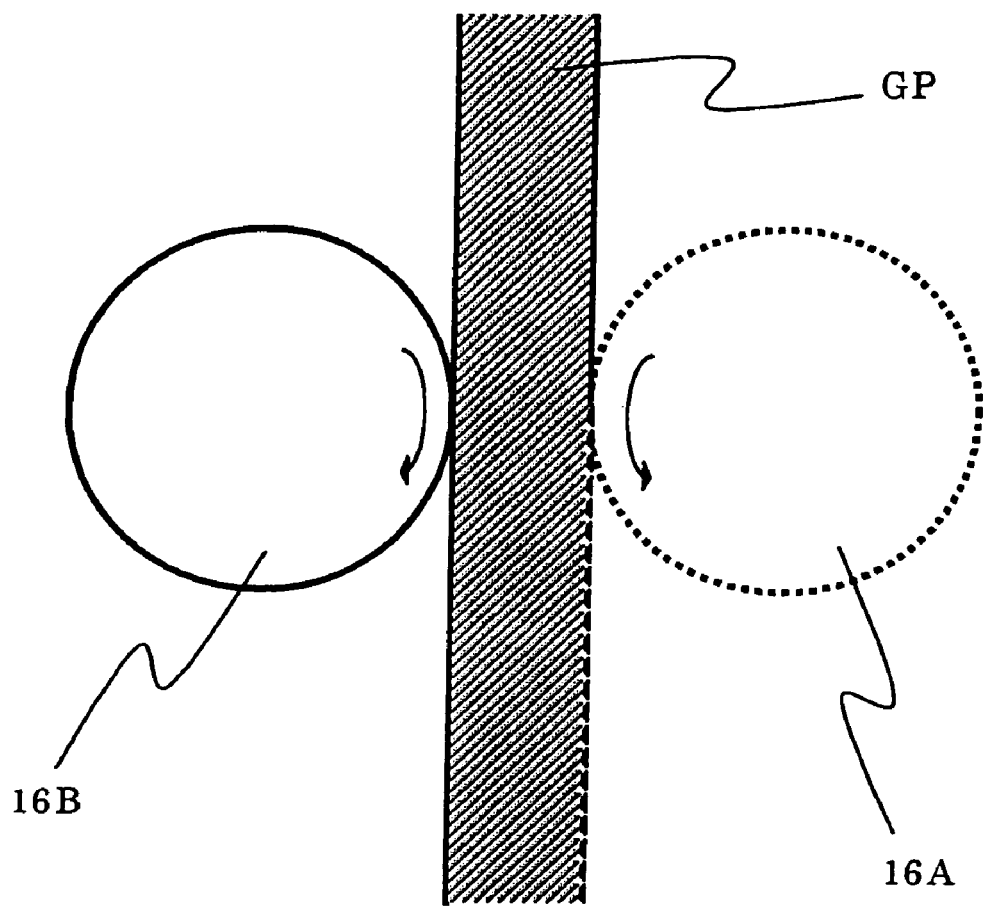
FIG. 5 is a conceptual figure showing transfer rollers, which is used for a glass substrate manufacturing, by a fusion process according to the third embodiment.

At that point, surfaces of the plate like glass are plastic deformed by a pressure applied by the pair of transfer rollers 16A and 16B, and an asperity is formed on the surface of the plate like portion. The portion of FIG. 4 designated by box "A" is shown in FIG. 5. Afterwards, the plate like glass GP is cut in desired size and a glass substrate is completed.

When forming TFT patterns or CF patterns on such glass substrate, a process control is conducted so as to vacuum contact a side on which asperity is formed. By this procedure, a condition for stabilization of contact and preventing generation of the static electricity are satisfied simultaneously, and defect prevention is stably accomplished. Moreover, as light is moderately scattered by the asperity on the surface of the glass substrate, there is also an effect for anti reflection.

In the present embodiment, as the asperity formed on the surface of the transfer roller 16A or 16B is concerned, it is desired that a height is in the range from 10 nm to 40 nm and a period is in the range from 0.1 mm to 1.2 mm, however, it is only necessary to determine these values appropriately according to the pressure applying by the transfer rollers 16A and 16B and the degree of solidification of the glass. Moreover, the asperity can be formed on the surfaces of both of the transfer rollers 16A and 16B. In this case, as the asperity is formed on both sides of the glass, it is not necessary to process control which side vacuum contact is conducted.

In addition, a structure in the present embodiment is that the fused glass flows into the fusion pipe overflows and flows down along a side surface (or side surfaces) of the fusion pipe. However, it is available that the fused glass can flow down from a slit opened at the bottom of the fusion pipe without overflowing.

(Embodiment 4)

Figure 6:
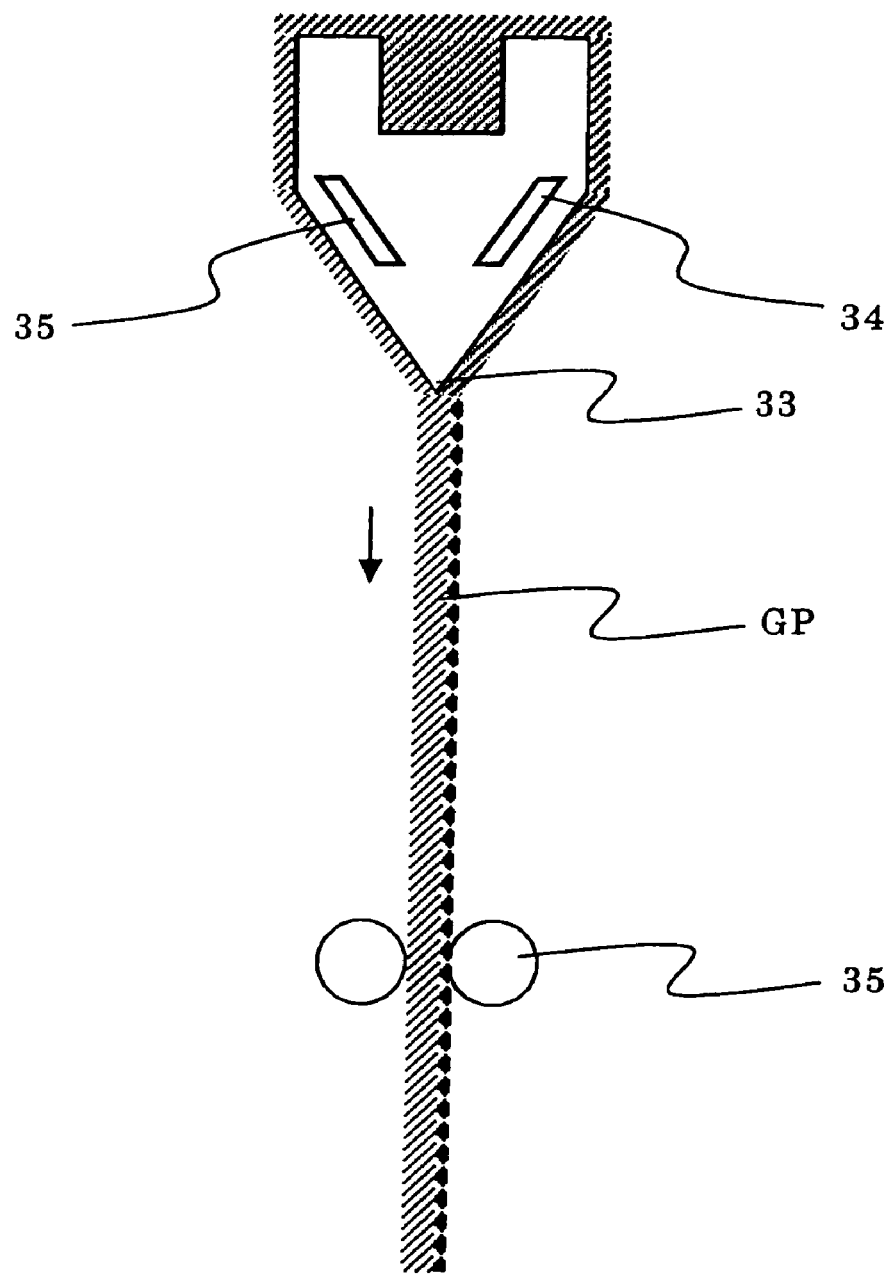
FIG. 6 is a conceptual figure showing a glass substrate manufacturing by fusion process according to a fourth embodiment.
Figure 7:
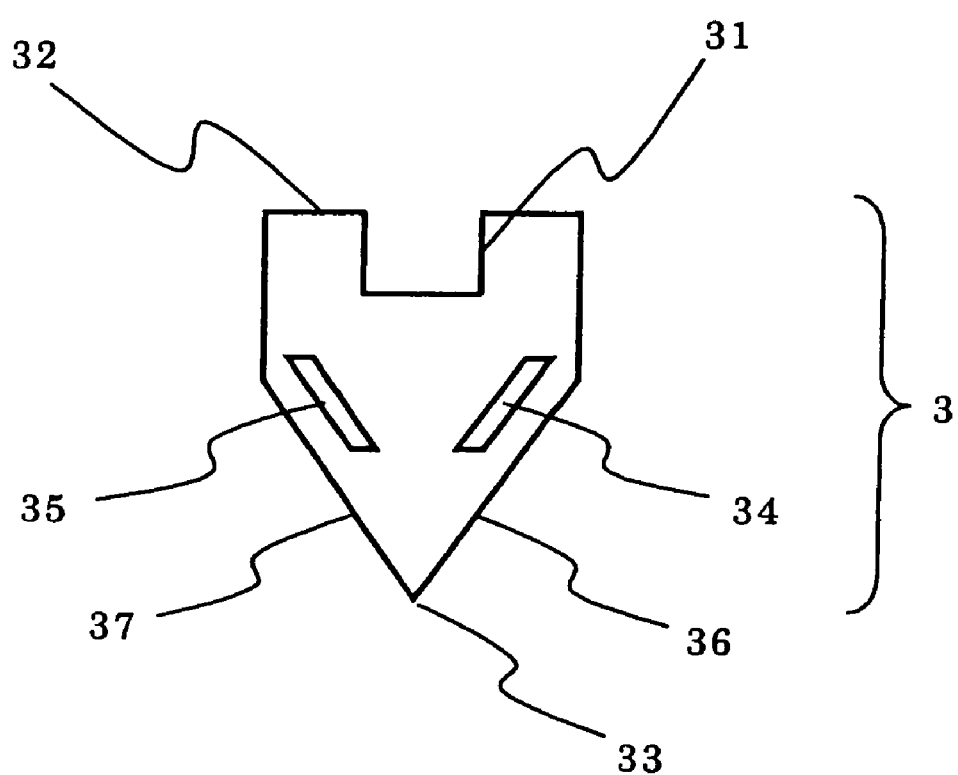
FIG. 7 is a conceptual figure showing a fusion pipe, which is used for a glass substrate manufacturing, by a fusion process according to the fourth embodiment.
Figure 8A:
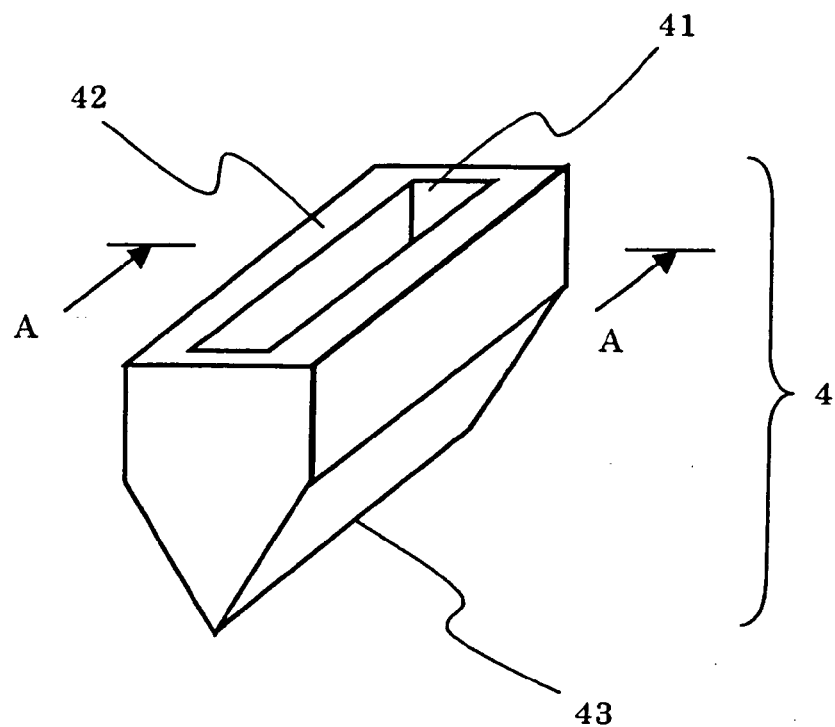
FIG. 8 is a conceptual figure showing a fusion pipe, which is used for a glass substrate manufacturing, by a fusion process according to prior art.
Figure 8B:
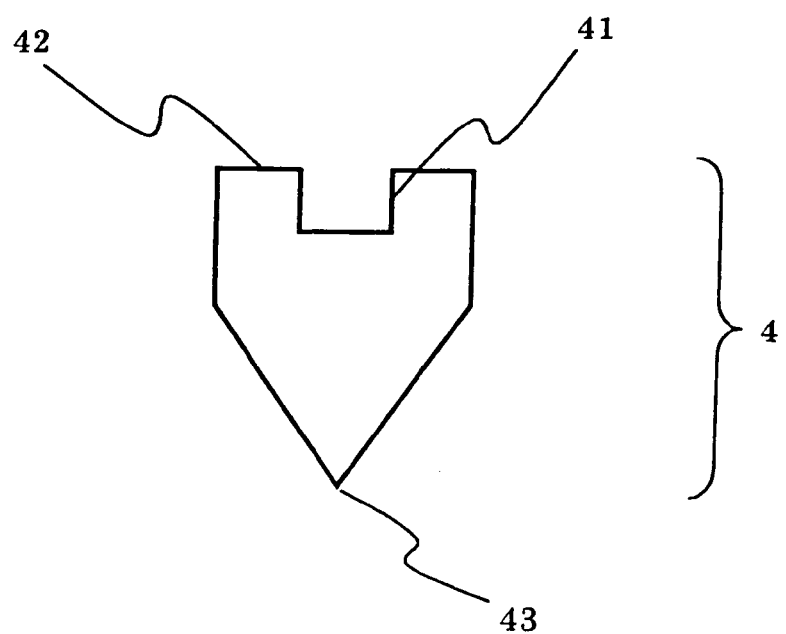
Figure 9:
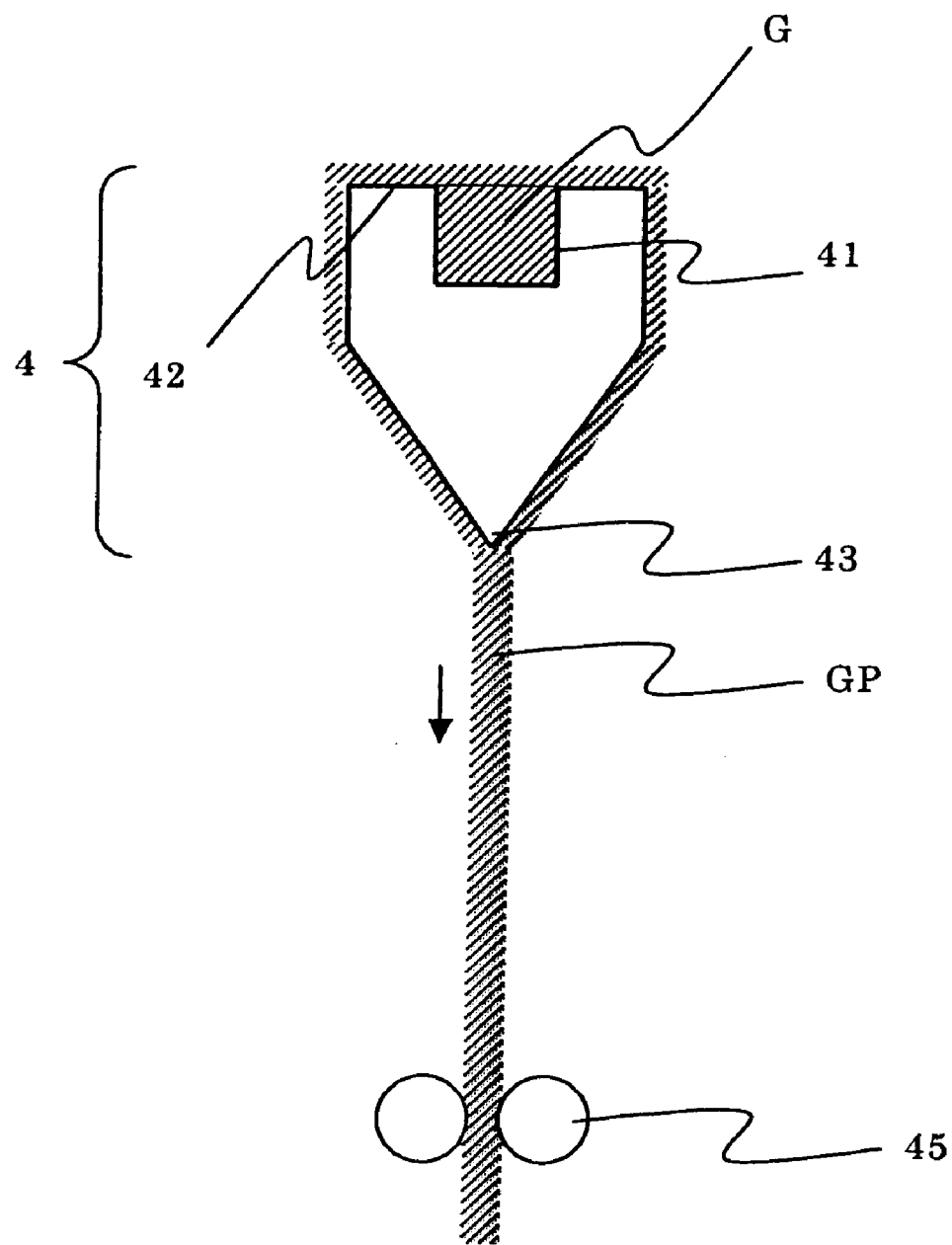
FIG. 9 is a conceptual figure showing a glass substrate manufacturing by fusion process according to prior art.

FIG. 6 is a conceptual figure showing a manufacturing method according to the Embodiment 4. In FIG. 6, although a fusion pipe is similar to that used in the Embodiment 1, an applied temperature control is different from that used in the Embodiment 1. It will be provided an explanation according to this fusion pipe below by using FIG. 7.

Upper part of the fusion pipe 3 is made as a trough like portion 31, which is open to the air, and a bank like portions 32 are arranged on both sides of the trough like portion 31. Moreover, bottom part of the fusion pipe 3 is made as a blade like portion 33. Moreover, heaters 34 and 35 are installed inside the fusion pipe 3. These heaters maintain a temperature on the surfaces of the fusion pipe 3 in a glass fusing state, and in the same time, the heaters are controlled so as to generate periodic temperature difference between side surfaces 36 and 37 in accordance with time passage.

Fused non-alkaline glass G flows into the trough like portion 31 of the fusion pipe 3. Fused non-alkaline glass G fills the trough like portion 31. The fused glass G filling the trough like portion 31 overrides the bank like portions 32 and overflows in both direction of the fusion pipe 3 and falls down along side surfaces 36 and 37.

The fused glass G reaches the blade like portion 33, which is at a bottom of the fusion pipe 3, descends and solidifies to form the plate like glass GP.

At this point, as explained above, the heaters are controlled so as to generate a periodic temperature difference between side surfaces 36 and 37 in accordance with time passage. In this embodiment, as the heater 35 is controlled to output virtually constant while the heater 34 is controlled to generate periodic output, the temperature of the side surface 37 being constant while that of the side surface 36 being up-and-down.

As the result, a flow rate of the fused glass flowing along the side surface 37 is being constant while a flow rate of the fused glass flowing along the side surface 36 is being up-and-down in accordance with time passage. Therefore, an asperity is formed on the surface of the plate like glass GP as which falling down after joining at the blade like portion 33.

The plate like glass descends and solidifies and is pulled down by the revolution of rollers 15. Afterwards, the plate like glass GP is cut into a desired size and a glass substrate is completed.

When forming TFT patterns or CF patterns on such glass substrate, a process control is conducted so as to vacuum contact a side on which asperity is formed. By this procedure, a condition for stabilization of contact and preventing generation of the static electricity are satisfied simultaneously, and defect prevention is stably accomplished. Moreover, as light is moderately scattered by the asperity on the surface of the glass substrate, there is also an effect for anti reflection.

In the present embodiment, the heater 35 is controlled to output virtually constant while the heater 34 is controlled to generate periodic output. However, in the present invention, it is only necessary that periodic temperature difference be generated with time passage between side surfaces 36 and 37 of the fusion pipe. Therefore, it is applicable that the heater 34 is controlled to output virtually constant while the heater 35 is controlled to generate periodic output. Alternatively, it is also applicable that both of heaters 34 and 35 are controlled to generate periodic output. In the latter case, the obtained glass substrate has asperities on both surfaces, and it is unnecessary to apply a process control so as to vacuum contact a side on which asperity is formed.

In the present embodiment, it is possible to form asperities, which have various height and period, by controlling power supply to heaters 34 and 35.

Industrial Applicability

The embodiments of the present invention can provide a large size glass substrate; which is used for FPD especially for display device like a TFT type liquid crystal device on which minute pattern is to be formed in good yield; and also provide a manufacturing method thereto.

What is claimed is:

1. A method for manufacturing a glass substrate for a flat panel display by fusion process, the method comprising:
    flowing fused glass into a fusion pipe;
    overflowing the fused glass toward two directions of the fusion pipe and flowing the fused glass along two side surfaces of the fusion pipe;
    joining the fused glass at a blade portion which is a bottom end of the fusion pipe;
    gradually cooling and solidifying the fused glass by flowing downward from the blade portion; and
    forming an asperity on a surface of the glass substrate by controlling heaters which are installed inside the fusion pipe to maintain a temperature on the surfaces of the fusion pipe in a glass fusing state, and to generate periodic temperature differences between the two side surfaces of the fusion pipe,
    wherein the periodic temperature differences between the two side surfaces of the fusion pipe produce periodic flow rate differences along the two side surfaces of the fusion pipe.

2. The method for manufacturing a glass substrate of claim 1, wherein the asperity has a height in a range from 10 nm 20 nm and a period in a range from 0.1 to 1 mm.

3. The method for manufacturing a glass substrate of claim 1, wherein the asperity has a height in a range from 15 nm to 20 nm and a period in a range from 0.1 mm to 0.6 mm.

4. The glass substrate of claim 1, wherein the glass substrate has a length and a width of 1000 mm or more respectively and has a thickness of 1.2 mm or less.

5. The method for manufacturing a glass substrate of claim 1, wherein the glass substrate comprises non-alkaline glass.

* * * * *